United States Patent [19]

Buck

[11] 4,162,381

[45] Jul. 24, 1979

[54] MICROWAVE OVEN SENSING SYSTEM

[75] Inventor: Ronald G. Buck, Burnsville, Minn.

[73] Assignee: Litton Systems, Inc., Beverly Hills, Calif.

[21] Appl. No.: 829,081

[22] Filed: Aug. 30, 1977

[51] Int. Cl.$^2$ .............................................. H05B 9/06
[52] U.S. Cl. ..................... 219/10.55 B; 219/10.55 M; 426/243
[58] Field of Search ................. 219/10.55 B, 10.55 R, 219/10.55 C, 494, 499, 510; 236/44 C, DIG. 8; 340/227 R, 227 D, 228, 2; 426/241, 242, 243

[56] References Cited

U.S. PATENT DOCUMENTS

| | | | |
|---|---|---|---|
| 2,595,748 | 5/1952 | Andrews | 219/10.55 B |
| 2,860,026 | 11/1958 | Long | 219/10.55 R |
| 3,185,809 | 5/1965 | Bohm et al. | 219/10.55 B |
| 3,281,568 | 10/1966 | Haagensen et al. | 219/10.55 B |
| 3,467,804 | 9/1969 | Smith | 219/10.55 B |
| 3,566,079 | 2/1971 | O'Neill | 219/494 X |
| 3,694,608 | 9/1972 | Loubert et al. | 219/10.55 B |
| 3,829,649 | 8/1974 | Igarashi | 219/10.55 D |
| 3,839,616 | 10/1974 | Risman | 219/10.55 R |
| 3,854,024 | 12/1974 | Kaufman et al. | 219/10.55 A |
| 3,875,361 | 4/1975 | Fukui et al. | 219/10.55 B |
| 3,903,395 | 9/1975 | Hamstra | 219/494 |
| 3,949,607 | 4/1976 | Nodolf | 236/44 C X |
| 3,999,027 | 12/1976 | Moore | 219/10.55 B |
| 4,009,359 | 2/1977 | Tallmadge et al. | 219/10.55 B |
| 4,011,428 | 3/1977 | Fosnough et al. | 219/10.55 B |
| 4,080,564 | 3/1978 | Nitta et al. | 219/10.55 B |

FOREIGN PATENT DOCUMENTS

| | | | |
|---|---|---|---|
| 2462165 | 4/1976 | Fed. Rep. of Germany | 219/10.55 B |
| 2312067 | 12/1976 | France | 219/10.55 B |

*Primary Examiner*—Arthur T. Grimley
*Attorney, Agent, or Firm*—Robert E. Lowe

[57] ABSTRACT

A microwave oven sensing system having a humidity sensor and a temperature sensor at an exit ventilation port of a microwave oven heating cavity to sense the exiting humidity and the air temperature of the microwave oven heating cavity. The humidity sensor and the temperature sensor are positioned to sense the "in-situ" environmental conditions of the microwave oven heating cavity such as adjacent to and by the exterior of the exit ventilation port of the microwave oven heating cavity. The sensors connect to a programmable controller and input the sensed "in-situ" environmental conditions of the microwave oven heating cavity to the programmable controller. "Characteristic humidity curves" for microwave cooking of different types of foods are stored as algorithms in a memory of the programmable controlled and the programmable controller controls the microwave cooking in accordance with a selected algorithm for the sensed "in-situ" environmental conditions. A numeric keyboard control panel inputs to the programmable controller the microwave cooking parameters and selects the microwave cooking algorithm. The programmable controller controls a microwave power source control circuit and an air exchange circuit according to the selected algorithm in the programmable controller. An additional humidity sensor may be positioned in a nonhostile environment within the frame structure of the microwave oven to provide a calibration reference for the humidity sensor positioned at the exit ventilation port of the microwave heating cavity.

21 Claims, 9 Drawing Figures

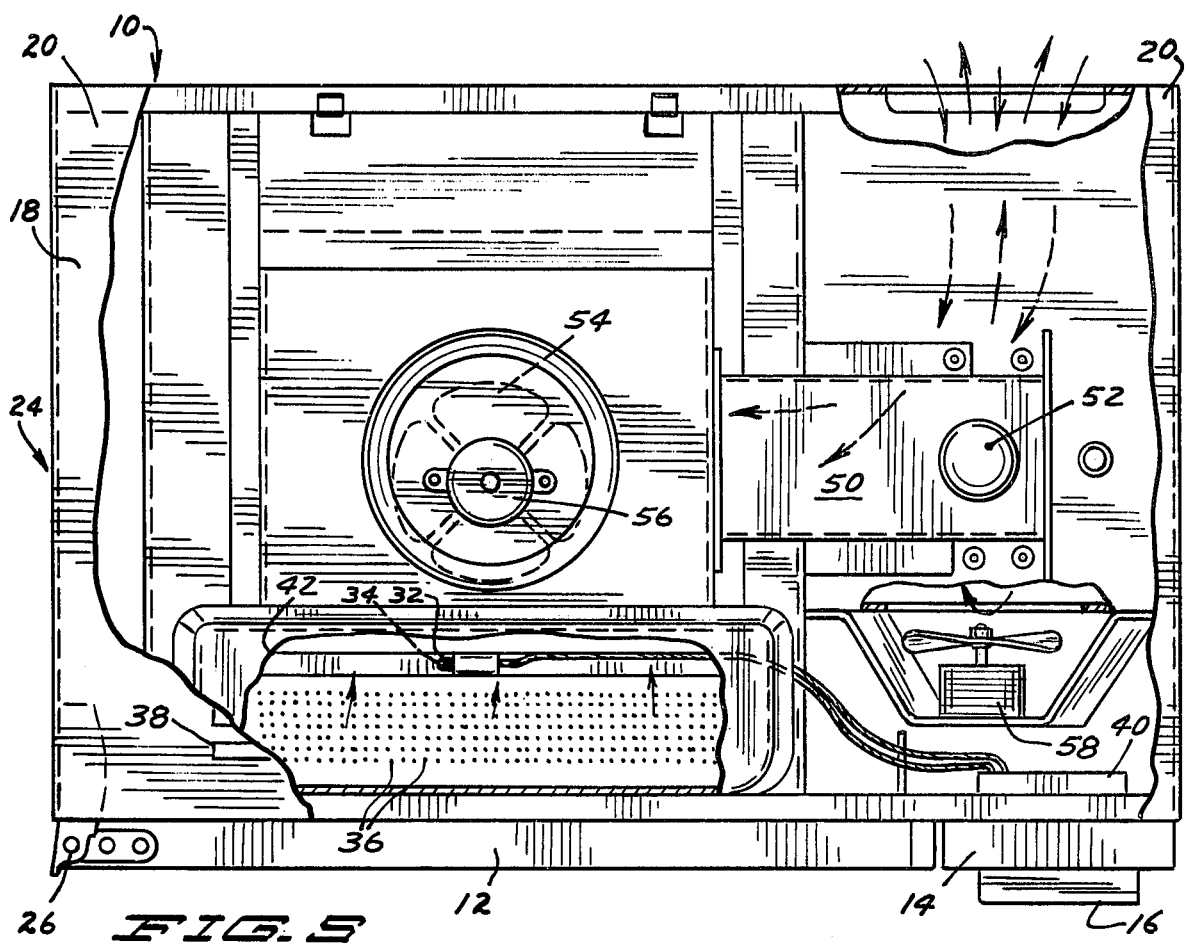
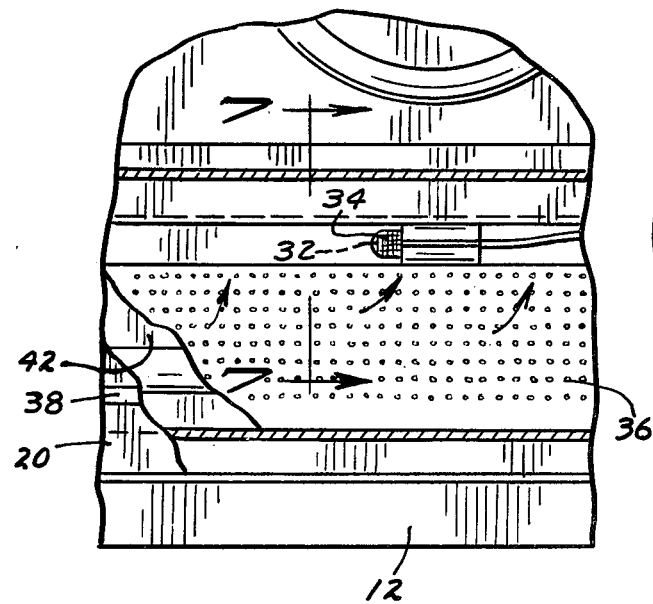
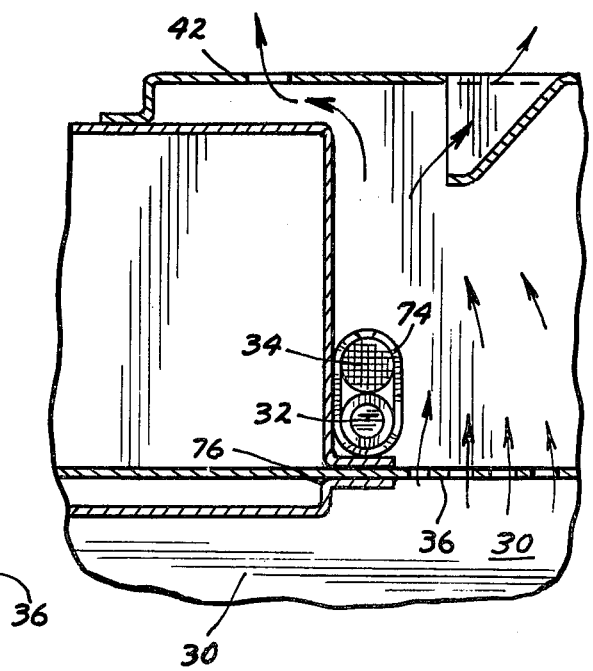

MICROWAVE OVEN SENSING SYSTEM

BACKGROUND OF THE INVENTION

1. Field of the Invention

The present invention relates generally to improvements in a microwave oven and more particularly, pertains to a new and improved microwave oven sensing system wherein humidity and temperature sensors are positioned to sense the "in-situ" humidity and temperature environmental conditions in the microwave oven heating cavity of the microwave oven.

2. Description of the Prior Art

In the field of microwave ovens, it has been a general practice to sense environmental conditions of the microwave oven heating cavity in which foods are cooking with sensing devices which have been positioned external to the cavity, usually in an exhaust duct exiting from the microwave oven heating cavity to prevent electromagnetic interference to the sensors. Such sensing devices have been unsatisfactory in that the sensors, to operate properly, require a continuous flow of gas in the duct and therefore suffer from the dynamics of the gas flow in the duct system. Also, the response time and accuracy of the measurement by the sensors depended upon the degree of equilibrium reached in the exhaust duct system. Further, other factors affected the accuracy of the sensors such as the gas pressure and flow rate from the microwave oven heating cavity through the duct system to the outside environment, the diameter and length of the duct system itself, and the susceptibility of the sensor itself to large concentrations of pollutants in the gases being expelled from the oven cavity.

Prior art sensing systems have not been able to accurately measure temperature and more importantly, humidity, in an "in-situ" environment as the sensors which were located in the ducts for electromagnetic interference considerations were subject to large numbers of water molecules carrying grease and carbon particles from the wet, moist environment of the microwave oven heating cavity through the exhaust duct system to the outside environment. The sensors were not able to endure the water molecules and the exhausted gases from the hostile environment of the microwave oven heating cavity over extended time periods as sometimes, the temperature of the exhausted gases exceeded sixty to seventy degrees centigrade further degrading the sensors. As a result of the severe environmental conditions in the microwave oven heating cavity, the sensors would go out of calibration in addition to suffering from sensor degradation.

Past prior art humidity sensors have been of the variety such as lithium choloride humidity sensors which are affected by continuous abrupt humidity and temperature changes in addition to exposure to humidity saturation conditions. These sensors are further subject to concentration of gases, freons, sulfides, ozones, dioxides and monoxides, nitrogen, as well as saturated water vapor. These prior art humidity sensors further did not have long term stability in use and storage in addition to being subject to degradation from continued cycling over wide humidity ranges.

This invention, a microwave oven sensing system, overcomes the disadvantages of the prior art by providing an accurate sensing system of the "in-situ" humidity and temperature environmental conditions of the microwave oven heating cavity.

SUMMARY OF THE INVENTION

The present invention obviates the foregoing disadvantages of the prior art by providing a microwave oven sensing system to sense the time dependent "in-situ" humidity and temperature environmental conditions in the microwave oven heating cavity and control the microwave cooking in accordance with cooking algorithms of characteristic humidity curves stored in a programmable controller according to the selected algorithm for the sensed time dependent "in-situ" humidity and temperature environmental conditions by the sensors.

According to the preferred embodiment of the present invention, there is provided a microwave oven sensing system having humidity and temperature sensors positioned to sense time dependent "in-situ" environmental conditions of the microwave oven heating cavity, a programmable controller having a memory which stores a microwave cooking algorithm of a "characteristic humidity curve" connected between the sensors and the microwave power supply control circuit whereby the programmable controller receives signals from the sensors of sensed "in-situ" environmental conditions of the microwave oven heating cavity and controls the microwave power supply circuit according to the microwave cooking algorithm for the sensed time dependent "in-situ" environmental conditions. The humidity sensor for sensing the "in-situ" humidity is an aluminum oxide sensor. The sensors and associated circuitry connect to the programmable controller through analog signal conditioner interface circuitry. The programmable controller has stored microwave cooking algorithms in the memory corresponding to "characteristic humidity curves" for different types of foods. Each "characteristic humidity curve" for a particular type of food is selected by a numeric keyboard on a control panel of the microwave oven from the memory of the programmable controller. The programmable controller also controls the air exchange rate, and increases or decreases the incoming air temperature by preheating the air with a coil of an infrared lamp or a resistance heater or other heating element.

A significant aspect and feature of the present invention is a microwave oven sensing system to accurately sense time dependent "in-situ" environmental conditions of humidity and temperature in a microwave oven heating cavity. The term "in-situ" as used in this application is defined as the actual time dependent environmental conditions which exist in the environment surrounding the food product which is located in and cooked in a microwave oven heating cavity. Although in the present invention, a humidity sensor and a temperature sensor may be positioned outside of the microwave oven heating cavity, the sensors are configured to sense the "in-situ" environmental conditions of the microwave oven heating cavity and provide "in-situ" signal information of the environmental conditions of the microwave oven heating cavity to a programmable controller controlling the microwave oven.

Another signficant aspect and feature of the present invention is a system which controls the operation of the microwave power supply control circuit and the air exchange control circuit for time dependent sensed "in-situ" humidity and temperature environmental conditions according to stored microwave cooking algorithms of "characteristic humidity curves" for different types of foods.

A further significant aspect and feature of the present invention is a humidity control on a numeric keyboard control panel to preset a predetermined humidity to be maintained within the microwave oven heating cavity during microwave cooking.

Having briefly described the preferred embodiment of the present invention, it is a principal object to provide a new and improved microwave oven sensing system which senses time dependent "in-situ" environmental conditions of the microwave oven cooking cavity. The time dependent "in-situ" environmental conditions are the humidity and temperature of the microwave oven cooking cavity.

An object of the present invention is to provide a humidity sensor and a temperature sensor positioned adjacent to and by the exit ventilation port exterior to a microwave oven heating cavity to sense time dependent "in-situ" environmental conditions of the microwave oven heating cavity.

Another object of the invention is to provide a programmable controller which receives the time dependent "in-situ" sensed humidity and temperature signals from the sensors and controls the microwave power supply control circuit and the air exchange control circuit according to selected microwave cooking algorithms of "characteristic humidity curves" for different types of food which have been stored in a memory of the programmable controller. Each particular type of food has its own individual "characteristic humidity curve" for microwave cooking.

A further object of the invention is to provide a numeric keyboard connected to the programmable controller to permit an individual to select the cooking algorithm for the particular type of food being cooked and to preset a predetermined humidity to be maintained within the microwave oven heating cavity. By properly maintaining the humidity at a predetermined level, food can be browned and cooked to doneness.

Still another object of the invention is to provide memory storage in the programmable controller for the "characteristic humidity curves" corresponding to the microwave cooking algorithms which the programmable controller compares to the sensed time dependent "in-situ" environment conditions to control cooking of particular foods in the microwave oven heating cavity. The sensed time dependent "in-situ" humidity and temperature environmental conditions indicate the internal doneness of the food being cooked in the microwave oven heating cavity.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like elements throughout the figures thereof and wherein:

FIG. 5 illustrates a top plan view of the microwave oven with a portion of the top of the housing wrap cutaway and also showing a top cutaway portion of the ventilation hood;

FIG. 6 illustrates a top enlarged and expanded view of a humidity sensor and a temperature sensor positioned adjacent to and by an exit ventilation port of the microwave oven with the housing wrap removed;

FIG. 7 illustrates a section of the present invention taken on line 7—7 of FIG. 6 looking in the direction of the arrows showing the humidity and temperature sensor positioned by the exit ventilation port;

DESCRIPTION OF THE PREFERRED EMBODIMENT

Figure 1:
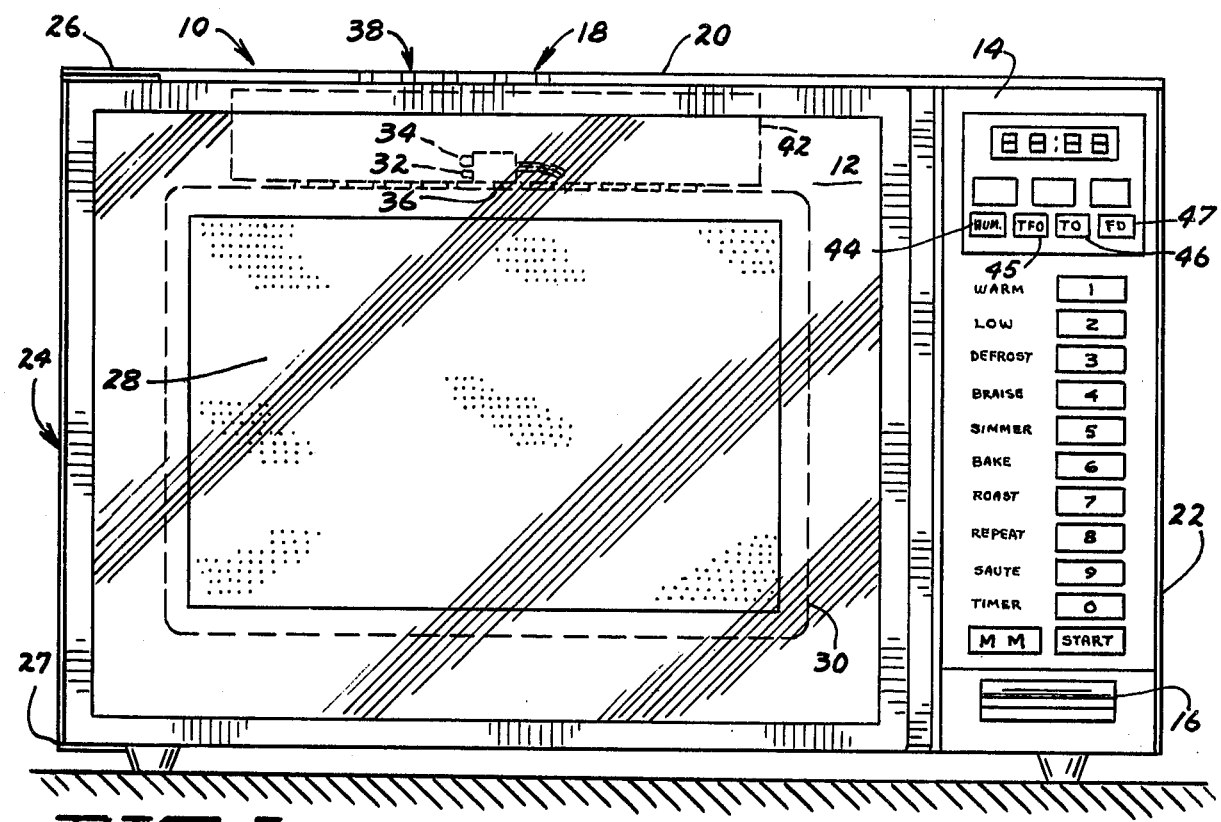
FIG. 1 illustrates a front plan view of a preferred embodiment of a microwave oven in accordance with the present invention.
Figure 3:
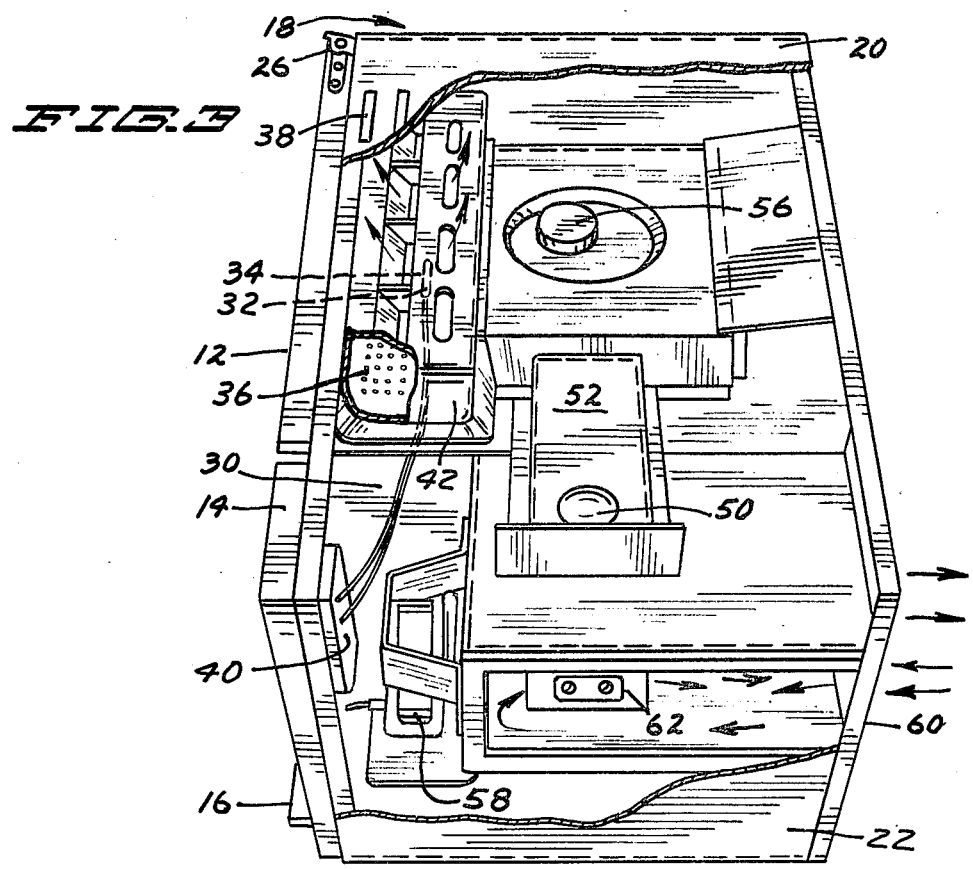
FIG. 3 illustrates a side and top perspective view of the microwave oven with a portion of a housing wrap removed and illustrating a cutaway portion of a ventilation hood.
Figure 4:
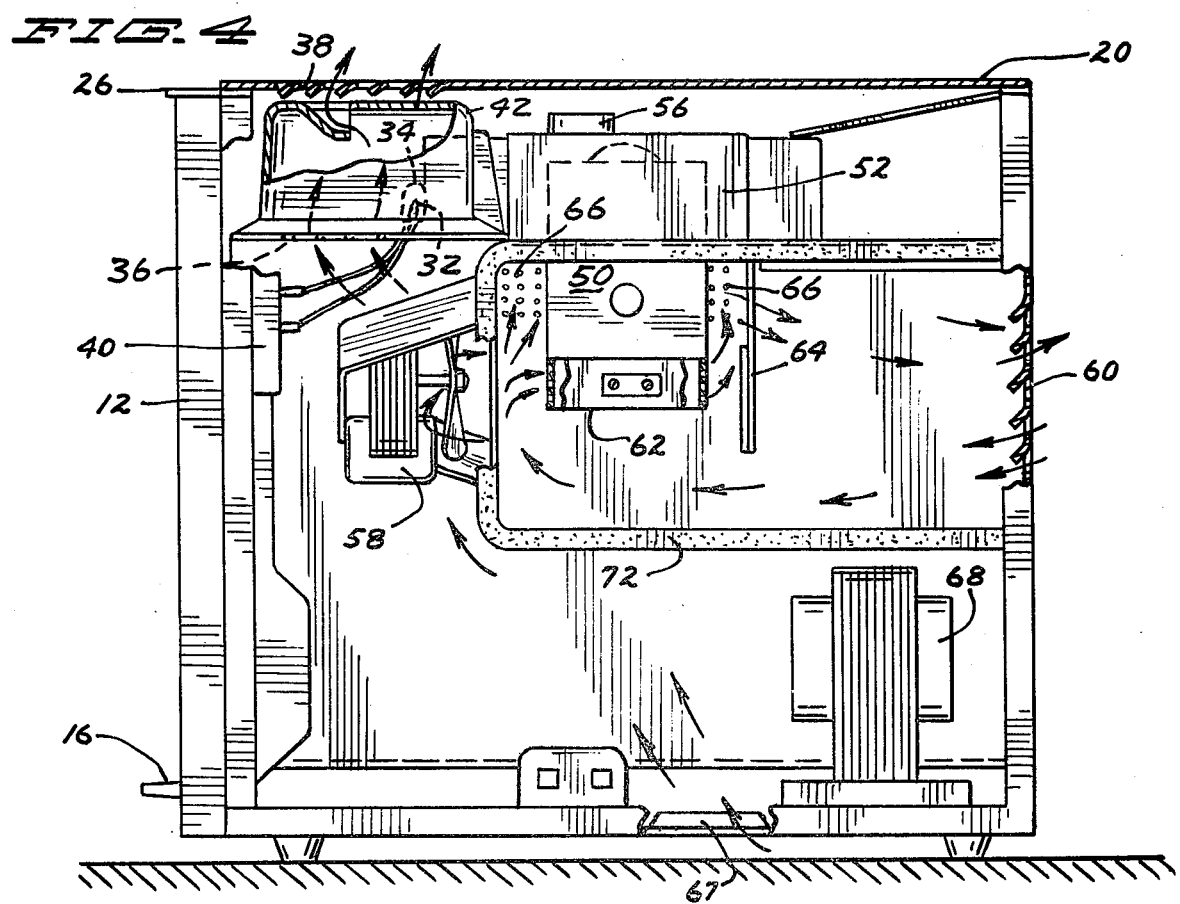
FIG. 4 illustrates a side view of the microwave oven with the housing wrap removed and showing the cutaway portion of the vent hood.

FIG. 1 which illustrates a front plan view of a preferred embodiment of a microwave oven 10 in accordance with the present invention shows an oven door 12, a numeric keyboard control panel 14, and a push bar door release handle 16. A three sided housing wrap cover 18 having a top 20, a right side 22 and a left side 24 encloses the top, the right hand side and the left hand side respectively of the microwave oven 10 frame structure. Upper and lower hinges 26 and 27 respectively hinge the door 12 to the left hand side 24 of the microwave oven 10 frame structure. The oven door 12 includes a window 28 consisting of a microwave radio frequency screen sandwiched between two panes of door glass to enable an operator to view cooking in the microwave heating cavity 30, the outline of which is shown in dashed lines. A humidity sensor 32 and a temperature sensor 34 are positioned adjacent to and by a plurality of exit port ventilation holes 36 in the top of the microwave heating cavity 30 and below a plurality of ventilation holes 38 in the top 20 of the housing wrap 18. The humidity sensor 32 and the temperature sensor 34 connect to a programmable controller 40 as shown in FIGS. 3–5 located behind the control panel 14 by electrical cables and interface with analog signal conditioner circuitry as required. A ventilation hood 42 shown in dashed lines is positioned between the plurality of exit port ventilation holes 36 in the top of the heating cavity 30 and the plurality of ventilation holes 38 in the top 20 of the housing wrap 18.

The numeric keyboard control panel 14 which connects to the programmable controller 40 is similar to the microwave oven control panel of the Litton Model 420 Microwave Oven, assignee of the present invention. The control panel 14 has a lighted digital display countdown timer and numeric controls to input cooking parameters to the programmable controller 40. In addition to the existing numeric controls on the numeric keyboard control panel 14, a "Humidity" control 44 to set a predetermined humidity in the microwave oven heating cavity 30, a "Turn Food Over" control 45 to indicate that the food is to be turned over, a "Time Out" control 46 to indicate that the door 12 is to be closed after turning food over after a predetermined time has elasped, and a "Done" control 47 to indicate internal doneness of the food are positioned on the control panel 14.

Figure 2:
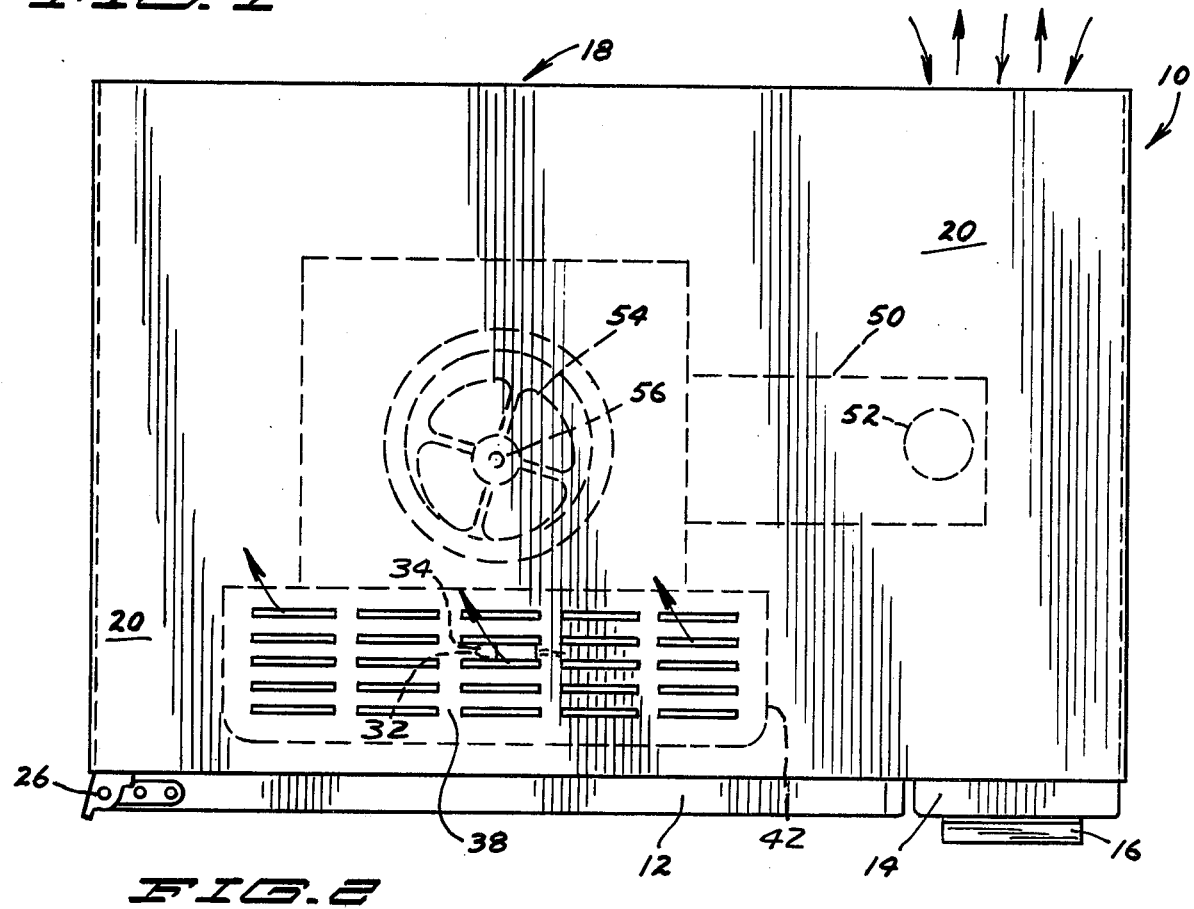
FIG. 2 illustrates a top plan view of the microwave oven.

FIG. 2 illustrates a top plan view of the microwave oven 10 showing the door 12, the numeric keyboard control panel 14, the push bar door release handle 16, an upper hinge 26, the plurality of ventilation holes 38 in the top 20 of the housing wrap 18, the outline of the ventilation hood 42 as shown in dashed lines, the humidity sensor 32 and the temperature sensor 34. A waveguide 52 couples energy from a microwave power source 50, a magnetron for way of example and purposes of illustration only, past a mode stirrer 54 driven by a mode stirrer motor 56 to the microwave heating cavity 30, these elements being illustrated in imaginary lines.

FIG. 3 illustrates a side and top perspective view of the microwave oven 10 with a portion of the housing wrap 18 removed and illustrating a cutaway portion of the ventilation hood 42 showing the top side 20 and the right side 22 of the housing wrap 18, the door 12, the control panel 14, the push bar door release handle 16, the upper hinge 26, the exterior side of the exit ventilation port 36 of the microwave heating cavity 30, the humidity sensor 32 and the temperature sensor 34, both shown in imaginary lines, positioned adjacent to and by the exterior side of the plurality of exit ventilation port holes 36 and connected to the programmable controller 40, the magnetron 50, the waveguide 52, and the mode stirrer 54 driven by the mode stirrer motor 56. A circulation fan 58 draws air through the lower portion of a rear intake ventilation port 60, past the underside of a diode rectifier 62 and turns the air around to circulate past the microwave power source 50 to cool the electrical components, finally exhausting the air out the upper portion of the rear intake ventilation port 60. A diverter 64 as shown in FIG. 4 further diverts the air flow into a plurality of entrance port ventilation holes 66 to introduce air through the side of and into the microwave heating cavity 30. The air circulates in the microwave heating cavity 30 around the food being cooked and is exhausted through the exit port ventilation holes 36, past the humidity sensor 32 and the temperature sensor 34 which are positioned adjacent to and by the plurality of exit port ventilation holes 36 in the top of the microwave heating cavity 30, and through the plurality of the ventilation holes 38 in top 20 of the housing wrap 18 via way of the ventilation hood 42.

FIG. 4 illustrates the side view of the microwave oven 10 with the right side 22 of the housing wrap 18 removed illustrating the air circulation fan 58 which also draws air up through a bottom intake ventilation port 67, past a power transformer 68 and a capacitor 70, and around horizontal frame member 72 which divides the microwave power source 50—diode bridge 62 compartment from the power transformer 68—capacitor 70 compartment. The air from the bottom intake ventilation port 67 joins the air circulation path of the air pulled in through the lower portion of the rear intake ventilation port. This air circulation is also introduced into the microwave heating cavity 30 through the entrance port ventilation holes 66, which after circulating within the heating cavity 30, is exhausted through the plurality of exit ventilation port holes 36 past the humidity sensor 32 and the temperature sensor 34 into the outside environment through the plurality of exit ventilation holes 36 via way of the ventilation hood 42 which is partially cutaway. The described path of air circulation in the microwave oven heating cavity is for way of example and purpose of illustration of the invention.

FIG. 5 illustrates a top plan view of the microwave oven showing a portion of the top 20 of the housing wrap 18 cutaway and showing a portion of the ventilation hood 42 cutaway. The humidity sensor 32 and the temperature sensor 34 are shown positioned adjacent to the plurality of exit port ventilaiton holes 36 in the top of the microwave heating cavity 30. Electrical cables connect the humidity and temperature sensors 32 and 34 respectively to the programmable controller 40 positioned behind the numeric keyboard control panel 14 through the analog signal conditioner interface circuitry. The air flow circulation path is shown by the arrows in the figure corresponding to the air flow circulation path through the rear intake ventilation port 60 and through the microwave oven heating cavity 30, the air being exhausted through the plurality of the exit port ventilation holes 36 to the plurality of ventilation holes 38 via way of the ventilation hood 42. All other numerals correspond to those elements previously described.

FIG. 6 illustrates a top enlarged and expanded view of the humidity sensor 32 and the temperature sensor 34 as shown in FIG. 5 positioned adjacent to and by the plurality of exit port ventilation holes 38 in the top of the microwave heating cavity 30 with the top 20 of the housing wrap 18 and the ventilation hood 42 partially cutaway. All other numerals correspond to those elements previously described.

FIG. 7 illustrates a section of the present invention taken on line 7—7 of FIG. 6 looking in the direction of the arrows showing the humidity sensor 32 and the temperature sensor 34 held by friction in a bracket 74 positioned adjacent to and by the plurality of exit port ventilation holes 36 in the top of the microwave heating cavity 30 with the bracket 74 being affixed to the oven frame structure 76 by any structure in the art such as adhesive. The humidity sensor 32 and the temperature sensor 34 can affix directly to the oven frame 76 by any suitable structure instead of being retained in the bracket 74.

Figure 8:
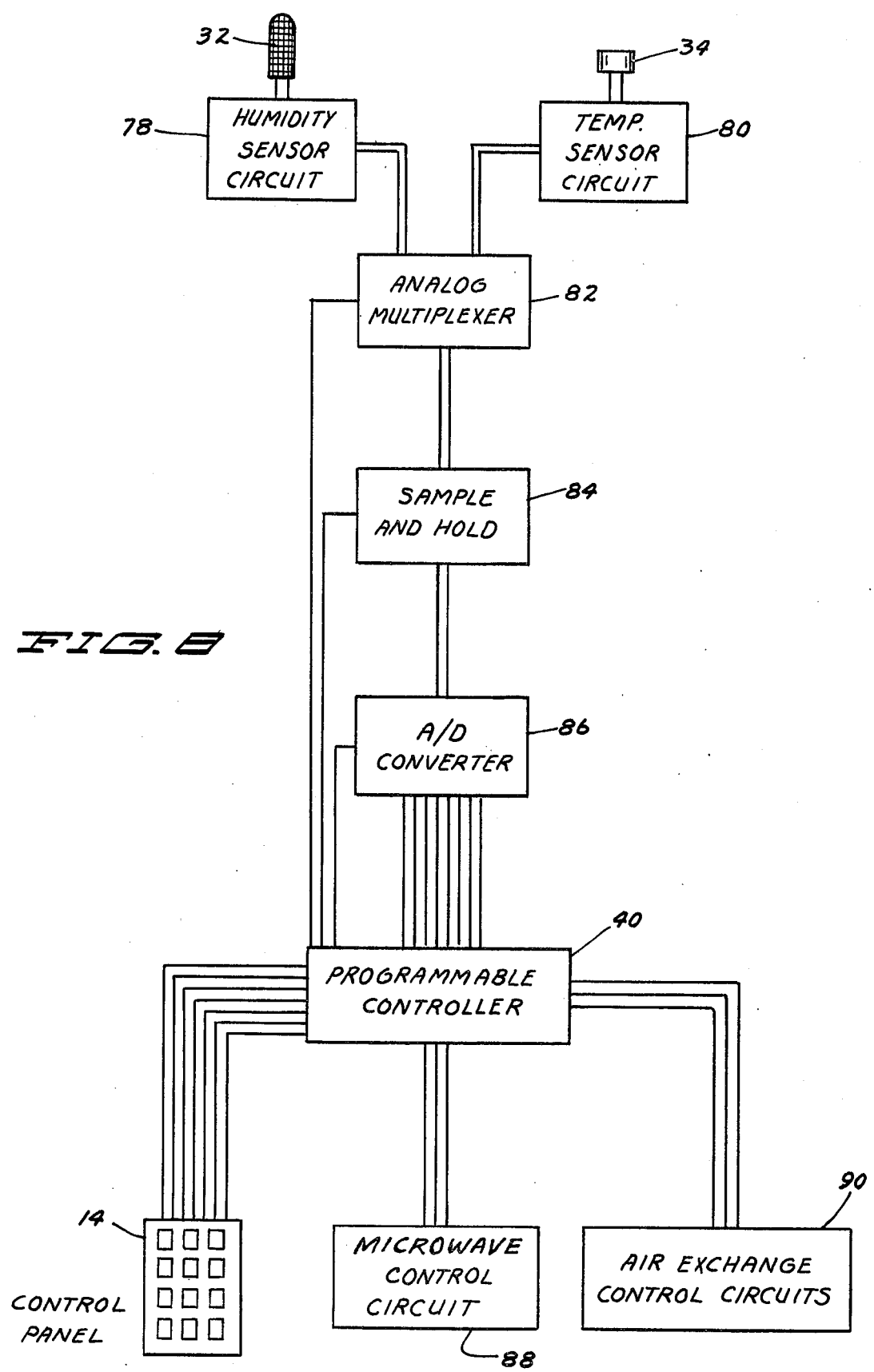
FIG. 8 illustrates an electrical circuit schematic block diagram for the present invention.

FIG. 8 illustrates an electrical circuit schematic block diagram of the present invention showing the humidity sensor 32 connected to a humidity circuit 78. The humidity sensor 32 and the humidity circuit 78 consist of an "off the shelf" package such as a Thunder Scientific Corporation PC-2000 Humidity Measurement module for the humidity circuit 78 and the BR-101B Aluminum Oxide humidity sensor 32. The temperature sensor 34 and the temperature circuit 80 consist of an "off the shelf" package such as a National Semiconductor Corporation LX 5700 Temperature Transducer. The humidity sensor 32 and the temperature sensor 34 can be integrated into a single unitary package such as an integrated circuit also containing the humidity circuitry 78 and the temperature circuitry 80 forming a single sensor package and eliminating the need for separate sensor elements and associated circuitry.

The humidity sensor 32 through the humidity circuit 78 and the temperature sensor 34 through the temperature circuit 80 connect to the programmable controller 40 through a series connection of an analog multiplexer 82, a sample and hold gate 84, and an analog to digital converter 86. The analog multiplexer 82, the sampler and hold gate 84, and the analog to digital converter 86 may consist of an analog signal conditioner circuit to properly interface the sensed temperature and humidity signals to the programmable controller 40. In the alternative, the interface circuitry can be directly incorporated in the programmable controller 40 to provide interfacing for input of the sensed and sampled humidity and the temperature signals.

A microwave control circuit 88 such as a silicon controlled rectifier power supply for the microwave power source 50 is controlled by the programmable controller 40. An air exchange control circuit for the fan 58 is also controlled by the programmable controller 40. The air exchange control circuit can further consist of an infrared lamp or a resistance heating coil not shown in the drawings to preheat the air temperature of the air being introduced at the entrance ventilation port 66 of the microwave oven heating cavity 30 during microwave cooking.

Preferred Mode of Operation

Time dependent "in-situ" environmental conditions of the microwave oven heating cavity 30 are sensed during microwave cooking of foods such as hot dogs, hamburgers, pork roasts, beef roasts, beef steaks, pork chops, poultry, fish, french fries, cakes, cookies, meat loafs, bread, vegetables, etc. The time dependent "in-situ" environmental conditions are defined as the sensed humidity and temperature environmental conditions of the microwave heating cavity 30 by humidity and temperature sensors. During the process of cooking foods with microwave energy, various energy conversions occur that modify the combined physical and chemical state of the food. These state changes directly determine the "doneness" or acceptable "palatability" of the cooked food. Since these states are electronically sensed and pragmatically correlated to the doneness of the food, then a microwave oven sensing system of the time dependent "in-situ" environmental conditions of the microwave oven heating cavity is achieved to control the microwave cooking of food. The purpose of implementing the microwave oven sensing system with the programmable controller having stored algorithms of "characteristic humidity curves" for different foods is to improve the "convenience and efficiency" of the microwave oven as well as the "palatability" of the food.

The humidity sensor 32 and the temperature sensor 34 are appropriately positioned as later described to sense the environmental conditions in an "in-situ" environment of the microwave oven heating cavity 30. Statically and dynamically, the exhaust air through the exterior of the exit ventilation port of the microwave oven heating cavity 30 is most depictive of the time dependent "in-situ" humidity and temperature environmental conditions of the microwave oven heating cavity 30. The environment on the exterior side of the exit ventilation port holes 36 for all practical considerations is equal to the environment on the interior side of the exit ventilation port holes 36 of the microwave oven heating cavity 30 permitting sensing of the time depending "in-situ" environmental conditions of the microwave oven heating cavity 30 even though the humidity sensor 32 and the temperature sensor 34 are not located within the microwave oven heating cavity 30.

While the humidity sensor 32 and the temperature sensor 34 have been illustrated in FIGS. 1-7 as being positioned adjacent to and by the exterior side of the exit ventilation port holes 36 of the microwave oven heating cavity 30 for way of example and purposes of illustration only, the sensors 32 and 34 can be positioned directly above the exit port ventilation holes 36 of the microwave oven heating cavity 30 so long as the surface of the humidity sensor 32 is shielded against condensation preventing saturation of the sensor 32 from the steam and condensation gases being vented from the microwave oven heating cavity 30. In the alternative, if the humidity sensor 32 is positioned above the exit port ventilation holes 36 of the microwave oven heating cavity 30 and not shielded against condensation, then it is necessary to program the programmable controller 40 to account for saturated humidity sensor 32 conditions resulting from condensation on the humidity sensor 32.

The descriptive "words and phrases" in describing the positioning of the humidity sensor 32 as illustrated in FIGS. 1-7 of the drawings, also includes the terms near, at, on top of, to one side of, in the general vicinity of, etc., the exit port ventilation holes 36 of the microwave oven heating cavity 30.

The main thrust of placement of the sensors is to position the humidity sensor 32 and the temperature sensor 34 to sense and sample the time dependent "in-situ" environmental conditions of the microwave oven heating cavity 30, and one of the preferred positions is where the humidity and temperature sensors 32 and 34 respectively are positioned adjacent to and by the exit port ventilation holes 36 of the microwave oven heating cavity 30 as being most depictive and in equilibrium with the microwave oven heating cavity 30. The humidity sensor 32 and the temperature sensor 34 are positioned on the exterior side of the exit port ventilation holes 36 so as not to be subjected to electromagnetic interference and because the environment on the exterior side of the exit port ventilation holes 36 is for all practical considerations is equal to the environment of the interior of the microwave oven heating cavity 30 permitting time dependent "in-situ" sensing of the humidity and temperature environment conditions of the microwave oven heating cavity 30.

The humidity and the temperature sensors 32 and 34 respectively can also be positioned within the interior confine of the ventilation hood 42 but yet near enough to the exit port ventilation holes 36 of the microwave oven heating cavity 30 to sense the time dependent "in-situ" environmental conditions of the microwave oven heating cavity 30.

The humidity sensor 32 and the temperature sensor 34 can further be positioned anywhere in the interior of the microwave oven heating cavity 30 instead of positioning the sensors 32 and 34 at the exterior of the exit ventilation port 36 so long as the sensors have proper electromagnetic interference shielding to isolate the sensors 32 and 34 from interference by the microwave energy source 50.

The humidity sensor 32 and the temperature sensor 34 can additionally be positioned in an exhaust duct not shown in the drawings of the microwave oven 10 if utilized to exhaust the steam and gases from the microwave oven heating cavity 30 through the frame structure to the front, back, bottom, side or top of the microwave oven 10. The humidity sensor 32 and the temperature sensor 34 can be positioned directly in the exhaust duct structure of the microwave oven 10 but the humidity and temperature equilibrium conditions in the duct should be compensated for by either second humidity and temperature sensors located at a distance from the first humidity and temperature sensors or by programming equilibrium constant conditions into cooking algorithms stored in memory of the programmable controller 40.

The microwave oven sensing system derives from the most fundamental microwave cooking principles. That is, as microwave energy is converted to thermal energy, the internal temperature of the food increases. As the internal temperature of the food increases, some of the thermal energy is used to break the bonding forces holding the water molecules to the food's cell structure. When the latent heat of vaporization has been added to the food, these free water molecules are vaporized and released locally. Thus, the rate of evaporation is directly proportional to the rate of temperature rise, and the integration of the rate of evaporation is proprotional to the weight loss of the food. By monitoring the humidity and the temperature in the microwave oven heating cavity 30, the food's internal temperature, surface temperature, and weight loss can be determined.

Figure 9:
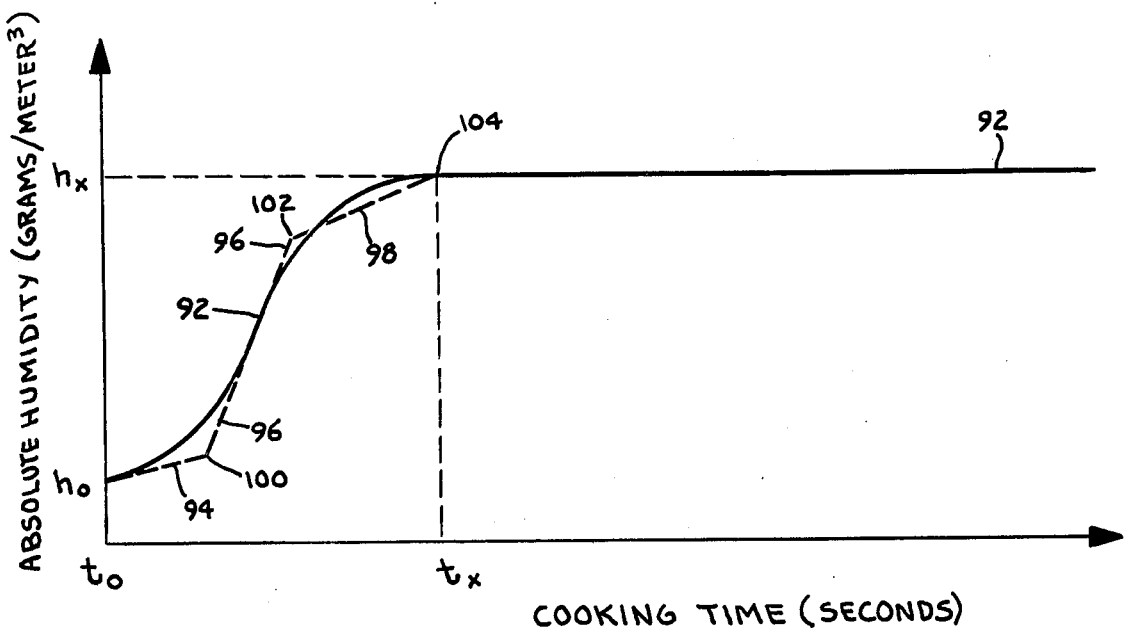
FIG. 9 illustrates a typical "characteristic humidity curve" for the present invention.

The absolute humidity in grams per cubic meter in the microwave oven heating cavity 30 as a function of time in seconds yields a "Characteristic Humidity Curve" 92 as illustrated in FIG. 9 for the microwave cooking of foods which is expressed by the equation 1 as $$h(t) = h(o) + (h_x - h_o)(1 - e^{-(Bt)^n}) \quad n > 1 \qquad \text{eq. 1}$$

where $h_o$ is the initial absolute humidity, $h_x$ is the peak absolute humidity, B is a constant in one over seconds, t is time in seconds and n is an integer. Absolute humidity is also known as vapor density. The "characteristic humidity curve" is determined by sensing the time dependent "in-situ" humidity and temperature environmental conditions of the microwave oven heating cavity 30 for a product being heated.

The "characteristic humidity curve" 92 of FIG. 9 of the absolute humidity in grams per cubic meters versus time in seconds can be approximated as a three segment 94, 96 and 98 piecewise linear curve prior to time $t_x$. The slope of the first segment 94 of the three segment piecewise linear curve is proportional to the rise in surface temperature of the food up to one hundred degrees centigrade. Once the hottest section of the surface has reached one hundred degrees centigrade at the change of slope 100, the humidity increases rapidly as illustrated by the slope of the second segment 96 of the three segment piecewise linear curve which is due to the "latent heat of vaporization" of the food. The change of slope 102 is indicative of the beginning of the surface temperature of the food reaching equilibrium. The slope of the third segment 98 of the three segment piecewise linear curve from point 102 to 104 is equilibrium occuring of the surface temperature of the food. The "characteristic humidity curve" 92 plateaus at point 104 indicating that the surface temperature of the food has reached equilibrium of one hundred degrees centigrades. While the peaked out plateau portion of the curve 92 is represented as a smooth curve, in reality there are "noise-like" perturbations on the curve due to surface boiling of water of the food. Any point on the "characteristic humidity curve" 92 is indicative of the surface temperature of the food while the integral of the area under the curve 92 at that point is indicative of the "internal doneness" of the food being cooked in the microwave oven heating cavity 30. Each particular type of food has its own individual "characteristic humidity curve" and the food during microwave cooking follows the "characteristic humidity curve" for that particular food.

In utilizing the microwave oven sensing system in the microwave oven 10, the interfacing circuitry of analog multiplexer 82, sample and hold gate 84, and analog digital converter 86 may not be required depending upon the type of programmable controller 40 utilized. The humidity sensor 32 and the temperature sensor 34 can connect directly to the programmable controller 40 obviating any need for analog signal conditioner interface circuitry including the need for a humidity sensor circuit 78 and temperature sensor circuit 80. The programmable controller 40 can be an "off the shelf" microprocessor such as an Intel 8080 or TMS 1000 with a read only memory (ROM) storing "characteristic humidity curves" as cooking algorithms in the memory.

The programmable controller 40 is programmed with cooking algorithms based on "characteristic humidity curves" for different types of foods such as meats, etc. to be cooked during microwave cooking. For example, different types of meats have different "characteristic humidity curves" which follow equation 1 and are implemented as cooking algorithms which are stored in the memory of the programmable controller. For example, it is known that meats brown when the surface temperature is rising at a certain rate and the ambient humidity at the surface region of the meat is at a certain humidity level. During microwave cooking, the programmable controller 40 receives the humidity and temperature signals from the humidity and temperature sensors 32 and 34 respectively positioned at the exit ventilation port 36 of the microwave heating cavity 30 sensing the "in-situ" environmental conditions, and follows a selected cooking algorithm of the "characteristic humidity curve" for the particular type and thickness of meat being cooked, thereby optimizing the cooking and browning of the meat. Further, the selected cooking algorithm for the meat being cooked through the programmable controller 40 can indicate to the cook as to the proper time to turn the meat over, indicate that the door 12 has been open for a time exceeding a predetermined time period, and the meat is cooked to doneness.

The programmable controller 40 is also programmed to make electronic decisions as to increasing or decreasing the air exchange rate of the air exchange control circuit 90 which consists of the fan 58; increasing or decreasing the microwave power source duty cycle, in this example, the magnetron control circuit 88, or; increasing or decreasing the incoming air temperature such as controlling preheating of the incoming air temperature with an infrared lamp or by passing the air over a resistance heater such as a Calrod.

Individual cooking algorithms for "characteristic humidity curves" for different types of foods stored in the programmable controller 40 can be selected for the type of food being cooked in the microwave oven 10 through the numeric inputs on the numeric keyboard control panel 14. This control panel contains the additional numeric input operator features for the standard microwave oven control panels currently on the market of a "Humidity" control 44, a "Turn Food Over" control 45, a "Time Out" control 46 and a "Done" control 47. The "Humidity" keyboard control 44 permits the input of the humidity cooking parameter for the selected cooking algorithm stored in the programmable controller 40.

By controlling the humidity in the microwave oven heating cavity 30, the internal temperature of the food, the surface temperature of the food, browning of the food, and the weight loss of the food can all be controlled according to the input humidity parameter by the "Humidity" control 44 on the numeric keyboard control panel 14 or to the selected cooking algorithm called from storage in the memory of the programmable controller 40. The "Humidity" control 44 permits the presetting of a predetermined humidity to be maintained within the microwave oven heating cavity 30 during microwave cooking.

The humidity sensor 32 sensing the time dependent "in-situ" humidity at the exit ventilation port 36 of the microwave oven heating cavity 30 inputs the sensed humidity to the programmable controller 40 which according to the selected stored cooking algorithm of the "characteristic humidity curve" for the particular type of food being cooked determines how the food is cooked, at what time the food is turned over, and at what time the food is done. The programmable controller 40 receives the sensed time dependent "in-situ" humidity from the humidity sensor 32 which is sensed relative humidity and also receives the sensed time dependent "in-situ" temperature from the temperature sensor 34 to convert the sensed relative humidity to absolute humidity for the cooking algorithm program stored in the programmable controller 40. The programmable controller 40 can then compute the temperature of the food which is indicative of the internal doneness of the food.

The programmable controller 40 also indicates to the cook when the optimum time is reached to turn a food over such as meat and activates a "Turn Food Over" control 45 such as illuminating a control light as well as sounding an audible alarm. This point occurs where the "characteristic humidity curve" 92 of FIG. 9 reaches peak absolute humidity $h_x$ at point 104 as determined by the programmable controller 40. If the cook fails to close the door 12 within a predetermined time as determined by the programmable controller 40 after turning the food over, the "Time Out" control 46 such as an illuminated control light as well as an audible alarm are activated by the programmable controller 40. The programmable controller also indicates to a cook when the food is done by activating the "Done" control 47 such as an illuminating a control light as well as sounding an audible alarm.

In commercial microwave cooking applications such as fast food franchises, it may be desired to cook food samples exactly the same way each time for identical food samples such as hamburgers, bread, pastry, etc. To accomplish the identiaal microwave cooking of food samples, the desired "characteristic humidity curve" determined empirically or through a previous cooling cycle for a food sample is stored in the memory of the programmable controller 40 as the cooling algorithm for that food. The programmable controller 40 then compares the stored cooking algorithm for the food being cooked to the "characteristic humidity curve" to maintain microwave cooking of the food sample in the microwave oven cavity 30 according to the cooking algorithm for the food.

An additional humidity sensor and associated interface circuitry which connects to the programmable controller 40 can be positioned in a nonhostile environment of the frame structure of the microwave oven 10 to provide calibration for the humidity sensor 32 located adjacent to and by the exterior of the exit ventilation port 36.

Various modifications can be made to the microwave oven sensing system of the present invention without departing from the apparent scope of this invention.

Specifically, the programmable controller 40 can store cooking algorithms to maintain the humidity at a predetermined level to brown foods, to indicate the temperature and internal doneness of food being cooked, to indicate the optimum time to turn food over, to control the cooking of juiced foods, to detect a fire in the cavity, etc.

Having thus described the invention, what is claimed is:

1. A method of controlling cooking in a microwave oven heating cavity comprising the steps of:
   (a) storing a microwave cooking algorithm in a programmable controller in a microwave oven;
   (b) providing a circulation path from an entrance ventilation port to an exit ventilation port through said microwave oven, said path including said microwave oven heating cavity;
   (c) elecromagnetically isolating a humidity sensor and a temperature sensor from said microwave oven heating cavity, said sensors being located in said ventilation path;
   (d) coupling microwave energy to said microwave oven heating cavity;
   (e) sensing the time dependent environmental conditions of said microwave heating cavity with said sensors during microwave heating in said cavity; and
   (f) controlling said microwave energy according to said stored cooking algorithm for said sensed time dependent environmental conditions.

2. A method according to claim 1 comprising the step of:
   a. storing a "characteristic humidity curve" for a particular type of food as said algorithm in said programmable controller.

3. A method according to claim 1 comprising the step of:
   a. storing a plurality of "characteristic humidity curves" for different foods as algorithms in said programmable controller.

4. A method according to claim 1 comprising the step of:
   a. positioning said sensors adjacent to and by an exit ventilation port of said microwave oven heating cavity.

5. A method according to claim 1 comprising the step of:
   a. positioning said sensors in said microwave oven heating cavity.

6. A method according to claim 1 comprising the step of:
   a. positioning said sensors in an exhaust duct of said microwave oven heating cavity.

7. Method for cooking food in a microwave oven comprising the steps of:
   a. storing a "characteristic humidity curve" as an algorithm in a memory of a programmable controller microwave oven;
   b. sensing and sampling the time dependent "in-situ" relative humidity and temperature at an exit ventilation port of a microwave oven heating cavity;
   c. converting the sensed and sampled relative humidity and temperature to absolute humidity;
   d. comparing the absolute humidity to the stored "characteristic humidity curve;" and,
   e. regulating a microwave power coupled to said microwave oven source to maintain the absolute humidity according to said stored algorithm.

8. Method for cooking food in a microwave oven according to claim 7 comprising the step of:

regulating air flow through said cavity to maintain the absolute humidity according to said stored algorithm.

9. Method for cooking food in a microwave oven according to claim 7 comprising the step of:
   a. regulating preheating of air flow through said cavity to maintain the absolute humidity according to said stored algorithm.

10. A microwave oven sensing system comprising:
   a. a microwave oven heating cavity
   b. microwave power means coupled to said cavity; and
   c. sensor means positioned to sense time dependent environmental conditions of humidity and temperature during microwave cooking in said microwave oven heating cavity.

11. The microwave oven of claim 10 wherein said sensor means comprises a humidity sensor and a temperature sensor positioned near an exit ventilation port of said microwave oven heating cavity.

12. The microwave oven of claim 10 wherein said sensor means comprises a humidity sensor and a temperature sensor positioned adjacent to each other at an exit ventilation port of said microwave oven heating cavity.

13. The microwave oven of claim 10 wherein said sensor means comprises an aluminum oxide humidity sensor and a temperature transducer.

14. The microwave oven of claim 10 wherein said sensor means comprises an aluminum oxide humidity sensor and a temperature sensor in a unitary package.

15. The microwave oven of claim 10 further comprising programmable controller means having a memory and connected between said microwave power means and said sensor means whereby said programmable controller means controls microwave heating in said microwave oven heating cavity according to an algorithm stored in said memory of said programmable controller.

16. The microwave oven of claim 15, further comprising air exchange control means connected to said programmable controller means whereby said programmable controller means controls air flow through a ventilation port in said microwave oven heating cavity according to said predetermined algorithm for said sensed time dependent environmental conditions.

17. The microwave oven of claim 16 further comprising humidity preset control means operably connected to said programmable controller means whereby a selected humidity is maintained during cooking in said microwave oven heating cavity by said programmable controller means as set by said humidity preset control means.

18. The microwave oven of claim 16 wherein said air exchange control means comprises a variable speed fan.

19. The microwave oven of claim 16 wherein said air exchange control means further comprises means for preheating said air prior to its passage into said microwave oven heating cavity.

20. The microwave oven of claim 19 wherein said preheating means comprises a resistance element heater.

21. The microwave oven of claim 19 wherein said preheating means comprises an infrared lamp.

* * * * *